Figure 1:
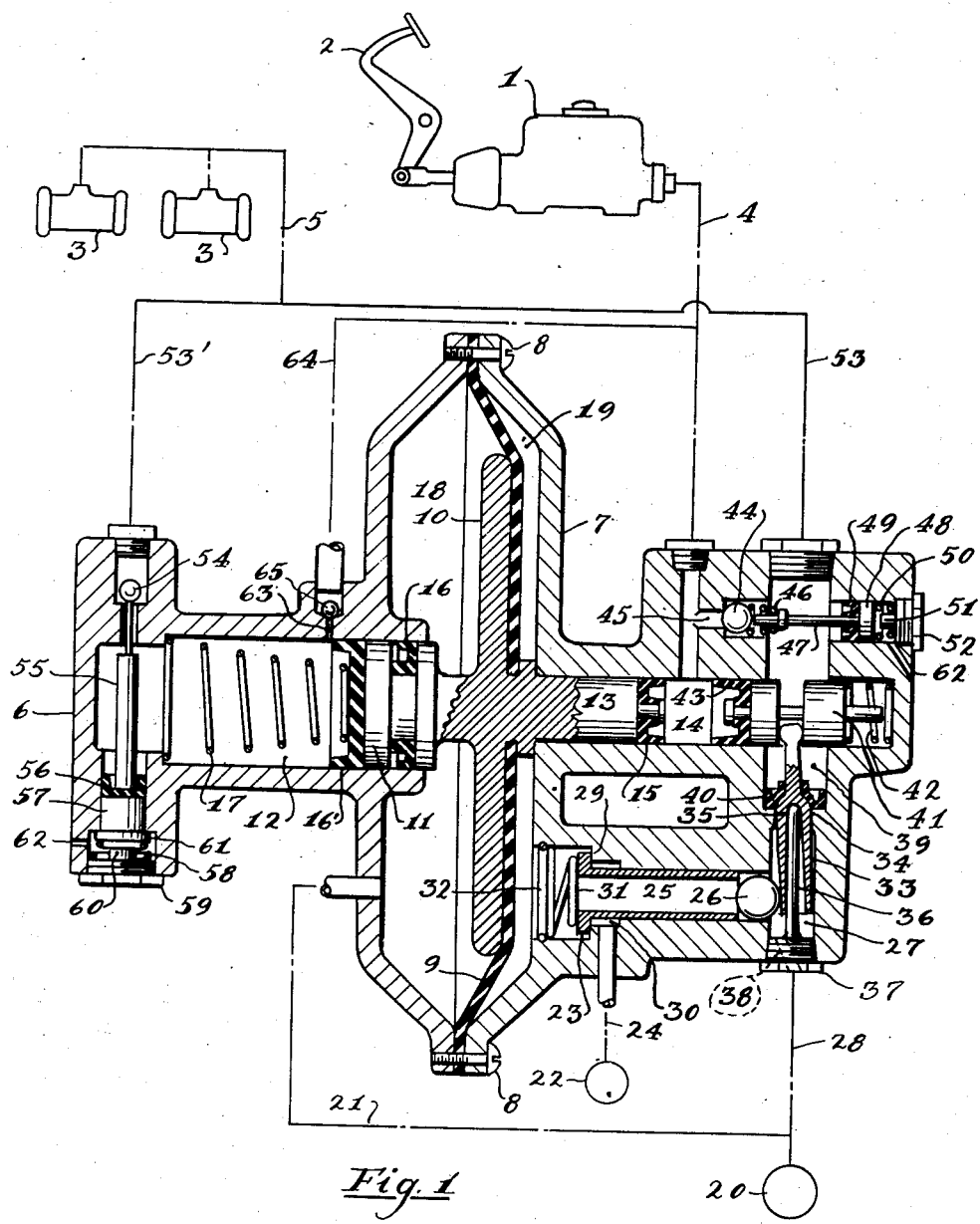

Aug. 14, 1945.	W. STELZER	2,381,989
HYDRAULIC BRAKE BOOSTER
Filed July 3, 1943	2 Sheets-Sheet 1

INVENTOR
William Stelzer

Patented Aug. 14, 1945

2,381,989

UNITED STATES PATENT OFFICE 2,381,989

HYDRAULIC BRAKE BOOSTER

William Stelzer, East Orange, N. J.

Application July 3, 1943, Serial No. 493,341

10 Claims. (Cl. 60—54.5)

The invention relates to hydraulic brake boosters and more particularly to a booster for increasing the volume of hydraulic fluid transmitted from the master cylinder to the wheel cylinders in a hydraulic braking system, where said master cylinder is of small displacement but capable of producing high pressures.

The object of the invention is to provide a power operated booster to increase the volume of fluid transmitted to the wheel cylinders before the hydraulic pressure in the latter becomes high, and to provide means to transmit the high pressure produced by the master cylinder directly to the wheel cylinders after the booster is incapable of further increasing the volume of hydraulic fluid transmitted to the wheel cylinders.

Another object is to provide novel means to control the power of the booster so that the pressure of the hydraulic fluid transmitted by the booster is in a fixed relation to the hydraulic pressure produced by the master cylinder, and to arrange said novel means in such a way as to become very sensitive to small pressure differences between the master cylinder pressure and the wheel cylinder pressure.

It is also the aim of this invention to make the booster operative in case of failure of the power.

A further aim is to provide means to return the fluid from the wheel cylinders when the brakes are being released.

Figure 2:
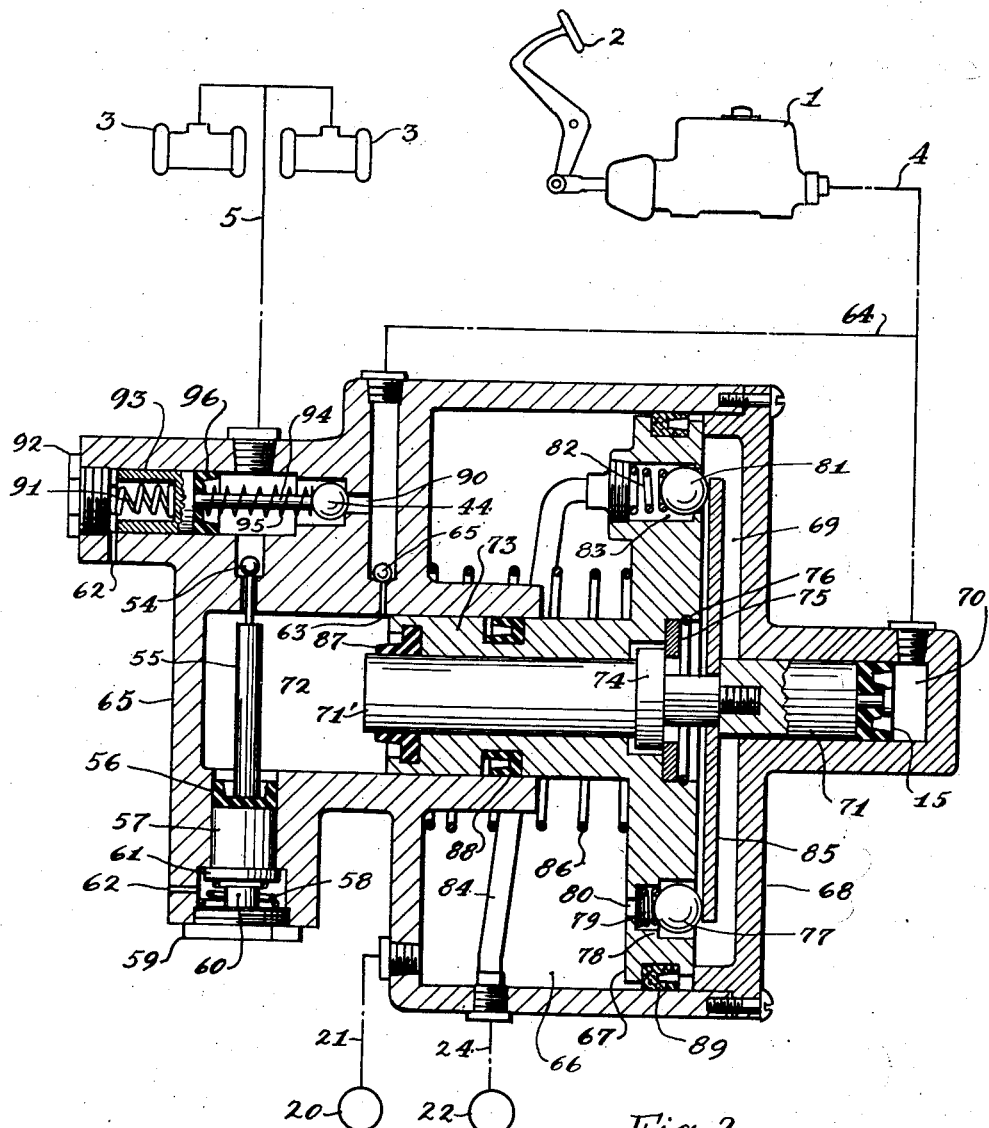

Other aims and advantages will become apparent by inspection of the drawings submitted for the purpose of illustration and not intended to define the scope of the invention, reference being had for that purpose to the subjoined claims. In the drawings:

Fig. 1 is a sectional elevation of the novel booster, connected to a hydraulic braking system illustrated digrammatically; and Fig. 2, a sectional elevation of a modified form, connected to a hydraulic braking system diagrammatically.

Before explaining the present invention in detail, it is to be understood that the invention is not limited in its application to the details of construction and arrangement of parts illustrated in the accompanying drawings, since the invention is capable of other embodiments and of being carried out or practised in various ways, also it is to be understood that the phraseology or terminology employed herein is for the purpose of description and not limitation.

Describing now the construction of the invention, Fig. 1 illustrates a hydraulic braking system comprising a master cylinder or pressure producing device 1 operated by manual power applied to foot pedal 2, and wheel cylinders or hydraulic pressure receiving means 3 to actuate the brakes or other similarly operated device.

While in conventional braking systems the fluid pressure line leads from the master cylinder directly to the wheel cylinders, in this novel system the booster is interposed in said pressure line, whereby fluid pressure transmitting line 4 leads from the master cylinder 1 to the booster, and from the latter line 5 leads to the wheel cylinders.

The hydraulic booster comprises two housings 6 and 7 secured together with screws 8 with a diaphragm 9 interposed. The latter fits on a piston unit comprising a diaphragm plate 10, a power piston 11 sliding in a cylinder chamber 12, and a small piston 13 sliding in cylinder chamber 14 subject to the hydraulic pressure from the master cylinder. The pistons are provided with seals 15 and 16, and 16', the latter being retained by return spring 17. The enlarged portions of housings 6 and 7 clamped together are part of an expansible chamber motor mechanism having working chambers 18 and 19 separated by diaphragm 9 which is also an element of the expansible chamber motor mechanism. Chamber 18 is open to a source of vacuum or low pressure 20 through line 21, while chamber 19 may be connected to a source of atmospheric or higher pressures 22 through a valve 23 and line 24, or to the source of vacuum 20 via passage 25, valve 26, chamber 27 and line 28, depending on which valve is open. Valve 23 is urged against valve seat 29 to close off chamber 19 from 30 by a conical spring 31 retained in housing 7 by a snap ring 32. The hollow valve stem of valve 23 is slidable in housing 7 and its extremity serves as a valve seat for ball 26 engaged by a rocker arm 33 fulcrumed at 34 and having a socket 35 to rest on a pin 36 extending upwardly from fitting 37 provided with a fluid passage 38. The upper arm of rocker or lever 33 extends into a hydraulic chamber 39 which is sealed against chamber 27 by a seal 40 seated at the bottom of chamber 39. The upper end of rocker arm 33 engages a groove in control piston 41 sliding in the same bore as piston 13 and being urged towards the latter by a light spring 42. A seal 43 is secured to piston 41. The right hand end of the piston 41 has clearance with the cylindrical bore in which the spring 42 is arranged, thus exposing the right hand extremity of the piston 41 to hydraulic pressures in the chamber 39.

In order to provide the flow of fluid from master cylinder 1 directly to wheel cylinders 3 when the power is insufficient to force piston 11 further into chamber 12, I provide a by-pass valve 44 urged against opening 45 by spring 46 and piston rod 47 of piston 48 sealed against the atmosphere with a seal 49. 50 represents a modulating spring urging piston 48 towards the left to keep ball 44 in a seated position against the hydraulic pressure in line 4 acting on ball 44 and the hydraulic pressure in chamber 39 acting on seal 49. To limit the movement of piston 48 in yielding to the pressure of the fluid in chamber 39 a stop 51 is provided on plug 52, the latter serving to retain spring 50. Chamber 39 is in communication with the wheel cylinders through line 53, which also communicates with chamber 12 through line 53', whereby these two lines may be considered a part of the booster unit. The fluid in flowing from chamber 12 to line 53' has to pass check valve 54 raised from its seat by a stepped push rod 55 seated on seal 56 of the piston 57 adapted to slide in housing 6 and urged upwardly by a spring 58 retained by a plug 59 having a stop 60. Piston 57 has a shoulder 61 serving as a stop to arrest the upward movement of the piston after ball 54 is unseated. A small vent hole 62 provides atmospheric pressure under piston 57. A similar hole, it will be noted, is provided to relieve the pressure behind piston 48. Spring 58 must be of sufficient strength to unseat ball 54 when the hydraulic pressure in line 53' resists this action and the pressure in chamber 12 is relieved, yet it must yield to the hydraulic pressure acting on piston 57 as soon as the pressure in chamber 12 is increased sufficiently to apply the brakes.

To permit the fluid transmitted to the wheel cylinders to return to the master cylinder and to insure that chamber 12 is filled first during the return of the booster elements to the starting position, a port hole 63 is provided in cylinder housing 6 and placed to be uncovered by seal 16' when piston 11 is in the "off" or starting position. Port 63 communicates with line 4 through line 64 with a check valve 65 interposed permitting the flow of fluid from port 63 to line 4 but not vice versa.

In the modification in Fig. 2 the control piston responsive to the hydraulic pressure of the master cylinder and to the hydraulic pressure of the wheel cylinders is incorporated in the working piston unit, whereby the valves for controlling the power fluid are more conveniently located in the piston of the expansible chamber motor mechanism. The booster unit in this modified construction comprises a housing 65 having a cylinder bore or chamber 66 in which slides a power piston 67 to serve as a member of the expansible chamber motor mechanism. The end of housing 65 has a cover 68 to form chamber 69 of the expansible chamber motor mechanism. The central portion of cover 68 has a chamber 70 in which slides a piston 71 of small displacement. Chamber 70 is in communication with master cylinder 1 through line 4. Housing 65 also has a central bore or chamber 72 in which slides a piston of large displacement 73 in unison with piston 67. The latter two pistons are bored out centrally to accommodate piston 71' secured to piston 71 and adapted to slide endwise a short distance, shoulder or collar 74 of piston 71' serving as a stop against ring 75 retained in piston 67 by a snap ring 76.

To direct the power fluid to and from the expansible chamber motor mechanism, a pair of valves are provided comprising ball 77 urged away from seat 78 by spring 79 to provide communication between chambers 66 and 69 through hole 80, and ball 81 urged into a seated position by spring 82 in chamber 83 to which flexible hose 84 is connected to carry to it atmospheric pressure from source 22. Springs 79 and 82 are opposed by a plate 85 having a central hole to fit freely on piston 71' and to be able to rock on piston 71. A helical spring 86 urges the piston unit into the "off" or starting position. 87, 88 and 89 represent seals between piston 71' and 73, between 73 and housing 65, and between piston 67 and housing 65, respectively. The means for returning the hydraulic fluid from the wheel cylinders to the chamber of larger displacement is the same as in Fig. 1, consisting mainly of check valve 54 and piston 57. The means for preventing the direct flow of fluid from the master cylinder to the wheel cylinders is conveniently located in housing 65 and comprises the ball 44 urged against hole 90 by a modulating spring 91 seated on plug 92 and acting through the intermediary of piston 93 and piston rod 94. Ball 44 is also urged in a seated position by a light spring 95 which serves to secure seal 96 to piston 93. Piston 93 is acted upon by the hydraulic pressure in the wheel cylinders or the hydraulic pressure in chamber 72.

Having thus described the construction I shall now explain the operation of the same. Assuming first that the braking system is at rest or in the "off" position as illustrated in Fig. 1, it will be noted that chambers 18 and 19 are evacuated, the pressure in chamber 19 being able to relieve itself through passage 25 past ball 26 into source of low pressure 20, which may be the intake manifold of an internal combustion engine.

Supposing now that the operator depresses brake pedal 2 to produce a hydraulic pressure in master cylinder 1, the pressure is communicated to chamber 14 urging to move piston 13 and 11 towards the left. The pressure also acts on piston 41 moving it towards the right to rock lever 33 about its fulcrum so that the lower part presses ball 26 on its seat to close off passage 25, and in continuing the movement valve 23 becomes unseated and spring 31 compresses. Communication is established between chamber 19 and source of pressure 22 so that air flows from 22 to chamber 19 to move diaphragm 9 and the piston unit 10, 11, 13 towards the left, the hydraulic fluid from the master cylinder helping behind piston 13 to force hydraulic fluid from chamber 12 to wheel cylinders 3. The hydraulic pressure produced in chamber 12 is not only communicated to the wheel cylinders but also to chamber 39 in order to act on the back of piston 41 in opposition to the manually produced pressure in chamber 14, there being clearance around the right hand end of the piston 41, as stated. As soon as the hydraulic pressure in the power circuit whose pressure is generated in chamber 12 approaches the pressure in chamber 14 or the manual circuit, spring 42 urges piston 41 towards the left, helped by spring 31, to seat valve 23 or to reduce the opening between valve 23 and seat 29 to such an extent as to maintain a certain pressure differential between the manual circuit and the power circuit, the pressure in chamber 14 being slightly higher than in chamber 39 in order to overcome spring 42. Due to this slight pressure differential the actual pressure causing friction of seal 43 is very low, resulting in a high sensitivity of these pressure responsive means. Observing now the effect of the pressure in chamber 12 on piston 57, spring 58 yields so that piston 57 comes to rest on stop 60 whereby ball 54 is free to become seated should the flow of hydraulic fluid from chamber 12 to wheel cylinders 3 cease.

As pistons 10, 11 and 13 travel towards the left at a rate proportional to the volume of fluid forced into chamber 14 by master cylinder 1, the pressures are gradually increased as the resistance to further expansion increases. Since the power of the expansible chamber motor mechanism is limited with a given diameter of diaphragm 9 and a limited pressure differential between 20 and 22, a certain maximum pressure is reached in chamber 12 which cannot be increased even though valve 23 is unseated. At this stage by-pass valve 44 comes into play. As the hydraulic pressure produced by master cylinder is further increased it unseats ball 44 in overpowering spring 46, spring 50 having been compressed previously due to the hydraulic pressure in chamber 39. Now the hydraulic fluid flows from master cylinder 1 to wheel cylinders 3 through line 4, past check valve 44, via chamber 39, and lines 53 and 5, check valve 54 being closed as the piston unit is stationary. In order to insure proper functioning of control piston 41 to control the valve after piston 48 is forced against stop 51, it is necessary to select spring 46 of sufficient strength to insure the pressure differential necessary to move piston 41. Thus it is necessary that spring 42 yields before spring 46.

Supposing now that the operator releases the foot pedal with a resultant relief of pressure in line 4 and chamber 14, valve 44 closes and piston 41 moves towards the left by virtue of spring 42 and the existing pressure in chamber 39, thereby allowing valve 23 to close and ball 26 to unseat so that the pressure in chamber 19 is relieved. As the pressure differential between chambers 18 and 19 is decreased, the pressure in chamber 12 drops accordingly, allowing spring 58 to push piston 57 upwardly and to unseat check valve 54, permitting fluid to return from wheel cylinders 3 to chamber 11, while pistons 12, 10, and 13 return to the "off" or starting position. When the starting position is reached, port 63 is uncovered by seal 16' so that hydraulic fluid may return from wheel cylinders 3 to master cylinder 1 through line 53', chamber 12, port 65, and line 64.

Assuming now that the booster is operated under a condition where power has failed, i. e., where no pressure differential exists between 20 and 22 and operation of valves 23 and 26 is useless, depression of pedal 2 results in a hydraulic pressure transmitted through line 4 to chamber 14 to move piston 13, 10 and 11 towards the left, piston 41 coming to rest against housing 7. Since piston 13 is of smaller displacement than piston 11, the hydraulic pressure in chamber 12 is proportionally lower, but sufficient to operate wheel cylinders 3 to apply the brakes. The arrangement of spring 50 and piston 48 serves to keep valve 44 closed so that the pressure in chamber 14 can be built up substantially without being able to overpower spring 50. So the secondary pressure in chamber 39 is built up, a pre-determined stage is reached where the hydraulic pressure in chamber 39 acting on piston 48 compresses spring 50 and permits the flow of hydraulic fluid from line 4 past check valve 44 into line 53 to wheel cylinders 5, check valve 54 becoming seated and piston 11 being arrested. The pressure loss at the second stage is only slight due to light spring 46, which illustrates the merit of piston 48 and spring 50.

As the operator releases pedal 2 and the pressure in chamber 14 drops, the pressure in chamber 12 is relieved proportionately so that spring 58 opens valve 54 and provides for the return of hydraulic fluid from the wheel cylinders to chamber 12, and from there to the master cylinder after piston 11 has arrived at the starting position where port 63 is uncovered.

Describing now the operation of the construction illustrated in Fig. 2, and assuming that the booster unit is in the "off" position, as shown, both chambers 66 and 69 of the expansible chamber motor mechanism are open to vacuum. Valve 81 is closed by virtue of spring 82, and valve 77 is held open by spring 79, the ball being pressed against plate 85 urging piston 71 towards the right where shoulder 74 rests against ring 75, the movement of piston 67 being arrested by cover 68. Spring 82 is of sufficient stiffness to dominate spring 79 so that the latter is incapable of unseating valve 81.

Supposing now that the operator depresses pedal 2 producing a hydraulic pressure in master cylinder 1, the pressure acts in chamber 70 urging piston 71 and 71' towards the left, causing a movement of the latter relative to pistons 67 and 73 and thereby pushing ball 77 into a seated position, the upper extremity of plate 85 remaining stationary and the lower end moving towards the left at an increased rate of travel until ball 77 is seated, resulting in a rocking action of plate 85. As piston 71 moves further towards the left, due to the resistance offered by ball 77 after it is seated the upper end of plate 85 moves towards the left to unseat ball 81 so that air is admitted from the source of pressure 22 through bore 84 into chamber 69, moving piston 67 and 73 towards the left to travel in unison with pistons 71 and 71'. 77 and 81 act as follow-up valves causing pistons 73 and 67 to follow piston 71. In the particular embodiment where pistons 71 and 71' are of equal diameter the pressure in chamber 72 is built up to be equal to or slightly less than the pressure in chamber 70. Balance of pressures at the ends of piston 71—71' causes valves 77 and 81 to be closed, the pressure in chamber 70 being slightly greater than in chamber 72 to compensate for spring 79. Piston 71 responsive to the hydraulic pressure of the master cylinder urges to increase the power of the expansible chamber motor mechanism, while piston 71' responsive to the pressure produced by the power operated piston 73 opposes 71 and thereby tends to decrease the power of the expansible chamber motor mechanism.

While pedal 2 is further depressed, chamber 70 increased, and pistons 71 and 71', 73, and 67 travel towards the left in unison, fluid in chamber 72 is displaced and forced to wheel cylinders 3 passing past check valve 54. As the pressure has reached a certain level in chamber 72, spring 58 is compressed and piston 57 rests on stop 60. A further rise in pressure in chamber 72 and wheel cylinders 3 causes spring 91 to yield so that light spring 95 becomes the sole means for urging ball 44 in a seated position. Supposing now that full power is applied to piston 67 and that it cannot be further increased, but that pedal 2 is depressed with an increasing force, a higher pressure is produced in chamber 70 and line 64 without the expansible chamber motor mechanism being able to produce a proportionate increase in chamber 72. As a result, the higher pressure in line 64 unseats ball 44 by overpowering spring 95, allowing fluid to pass from master cylinder 1 through line 64, past ball 44, and through line 5 to wheel cylinders 3, pistons 71, 73 and 67 being stationary and ball 54 seated. When the operator releases pedal 2, pistons 71 and 71' move towards the right, allowing valve 81 to seat and 77 to open so that the entire piston unit may return to the starting position due to spring 86, while valve 54 is held open by spring 58 which expands as soon as the pressure in chamber 72 has dropped. In the "off" position the fluid that had passed from the master cylinder to wheel cylinders 3 through valve 44 may return again through port 63.

I claim:

1. In a hydraulic system having a hydraulic pressure producing device and hydraulic pressure receiving means, in combination, a booster comprising an expansible chamber of small displacement in communication with said hydraulic pressure producing device, an expansible chamber of larger displacement in communication with said hydraulic pressure receiving means, a check valve interposed between said chamber of larger displacement and said hydraulic pressure receiving means and operative to prevent the flow of hydraulic fluid from the latter to the former, mechanical means to transmit the pressure of said expansible chamber of small displacement to said expansible chamber of larger displacement so that an increase in volume in said expansible chamber of small displacement enforces a proportionately greater decrease in volume in said expansible chamber of larger displacement, power means to assist to reduce the volume of said expansible chamber of larger displacement proportionately to the hydraulic pressure produced by said hydraulic pressure producing device, valve means to provide a hydraulic passage from said hydraulic pressure producing device to said hydraulic pressure receiving means when a certain pressure is reached, means for opening said check valve when pressure in said chamber of larger displacement is below a predetermined point, and means to provide a passage to return the hydraulic fluid to said hydraulic pressure producing device from said expansible chamber of larger displacement after the pressure in said hydraulic pressure producing device is relieved.

2. The construction as claimed in claim 1, where said valve means consists of a check valve arranged to check the flow of hydraulic fluid from said hydraulic pressure receiving means to said hydraulic pressure producing device, resilient means to urge to keep said check valve closed, and means responsive to the hydraulic pressure communicated to said hydraulic pressure receiving means to urge said resilient means to yield to allow said check valve to open to permit the flow of fluid from said hydraulic pressure producing device to said hydraulic pressure receiving means.

3. In a hydraulic braking system having a master cylinder operated by the operator and wheel cylinders to operate the brakes, in combination, a booster comprising a cylinder of small displacement in communication with said master cylinder, a cylinder of larger displacement in communication with said wheel cylinders, a check valve interposed between said wheel cylinders and said cylinder of larger displacement arranged to check the flow of fluid from said wheel cylinders to said cylinder of larger displacement, a piston in said cylinder of small displacement, a piston in said cylinder of larger displacement, the former being arranged to actuate the latter so that an increase in the volume of hydraulic fluid in said cylinder of smaller displacement enforces a proportionately greater decrease in the volume of hydraulic fluid in said cylinder of larger displacement, power means to assist to move said piston in said cylinder of larger displacement with a force in proportion to the hydraulic pressure in said master cylinder, a check valve intermediate said master cylinder and said wheel cylinders arranged to check the flow of fluid from said wheel cylinders to said master cylinder, spring means arranged to urge said check valve in a closed position, means responsive to the hydraulic pressure in said wheel cylinders to oppose said spring means in order to permit the flow of hydraulic fluid from said master cylinder to said wheel cylinders after a certain pressure is reached, means for opening said first named check valve when pressure in said cylinder of larger displacement is below a predetermined point, and means to provide a passage for the return of fluid from said cylinder of larger displacement to said master cylinder after the hydraulic pressure in said master cylinder is relieved.

4. In a hydraulic braking system having a master cylinder operated by the operator and wheel cylinders to operate the brakes, in combination, a booster comprising a cylinder of small displacement in communication with said master cylinder, a cylinder of larger displacement in communication with said wheel cylinders, a check valve interposed between said cylinder of larger displacement and said wheel cylinders to check the flow of fluid from said wheel cylinder to said cylinder of larger displacement, a piston in said cylinder of small displacement, a piston in said cylinder of larger displacement, the former being arranged to actuate the latter so that an increase in volume of hydraulic fluid in said cylinder of smaller displacement enforces a larger displacement in said cylinder of larger displacement to force fluid from the latter to said wheel cylinders, an expansible chamber motor mechanism to assist to move said piston in said cylinder of larger displacement, valve means to direct power fluid to and from said expansible chamber motor mechanism, means responsive to the hydraulic pressure produced by said master cylinder to urge said valve means to increase the power of said expansible chamber motor mechanism, means responsive to the hydraulic pressure produced by said piston in said cylinder of larger displacement to urge said valve means to decrease the power of said expansible chamber motor mechanism, a normally closed check valve in communication with said wheel cylinders on one side and said master cylinder on the other side, and arranged to prevent the flow of fluid from said wheel cylinders to said master cylinder, means to yieldingly urge said normally closed check valve to remain in a closed position, means responsive to the hydraulic pressure of said wheel cylinders to oppose said means that urge said check valve to remain closed, a passage in communication with said master cylinder and said cylinder of larger displacement when the piston in the latter is retracted, and means to provide the return of hydraulic fluid from said wheel cylinders to said cylinder of larger displacement and through said passage to said master cylinder after the hydraulic pressure in the latter is relieved.

5. The construction as claimed in claim 4, where said means to provide the return of hydraulic fluid from said wheel cylinders to said cylinder of larger displacement comprises a spring urging to unseat said check valve that is interposed between said wheel cylinders and said cylinder of larger displacement, and a piston responsive to the hydraulic pressure in said cylinder of larger displacement opposing said spring to permit said check valve to remain closed.

6. In a hydraulic braking system having a master cylinder operated by the operator and wheel cylinders to apply the brakes, in combination, a booster comprising a cylinder of small diameter in communication with said master cylinder, a cylinder of large diameter in communication with said wheel cylinders through the intermediary of a check valve permitting the flow of hydraulic fluid from said large cylinder to said wheel cylinders but checking the flow in the opposite direction, said cylinders being opposed and co-axial with respect to each other, a small piston in said small cylinder, a power piston in said large cylinder, said piston in said small cylinder extending through said power piston to be responsive to the hydraulic pressure produced by said master cylinder on one side and to the hydraulic pressure produced by said power piston on the other side, stops to limit the travel of said small piston relative to said power piston, an expansible chamber motor mechanism to actuate said power piston, follow-up valve means responsive to the excursions of said small piston relative to said power piston to direct power to said expansible chamber motor mechanism to urge said power piston to follow said small piston to force hydraulic fluid from said cylinder of large diameter to said wheel cylinders, means to provide a passage from said master cylinder to said wheel cylinders after a certain pressure is reached, means for opening said check valve when pressure in said cylinder of larger displacement is below a predetermined point, and means to provide the return of fluid from said cylinder of large diameter to said master cylinder after the hydraulic pressure in said master cylinder is relieved.

7. In a hydraulic braking system having a master cylinder operated by the operator and wheel cylinders to operate the brakes, in combination, a booster comprising a cylinder of small displacement, fluid pressure transmitting means between said master cylinder and said cylinder of small displacement, a cylinder of larger displacement co-axial with and opposed to said cylinder of small displacement, fluid pressure transmitting means between said cylinder of larger displacement and said wheel cylinders, a check valve interposed to check the flow of hydraulic fluid from said wheel cylinders to said cylinder of larger diameter but to permit the flow vice versa, pistons in said cylinders connected together to move in unison whereby a certain amount of hydraulic fluid forced into said cylinder of smaller displacement urges a larger displacement of hydraulic fluid in said cylinder of larger displacement to be forced to said wheel cylinders, a double-acting control piston responsive on one side to the hydraulic pressure produced by said master cylinder and on the opposite side to the hydraulic pressure communicated to said wheel cylinders, an expansible chamber motor mechanism to assist said pistons, power fluid to operate said expansible chamber motor mechanism, valve means to direct power fluid to and from said expansible chamber motor mechanism, means responsive to the excursions of said control piston to operate said valve means whereby the hydraulic pressure produced by said master cylinder urges to increase the power of said expansible chamber motor mechanism and the hydraulic pressure communicated to said wheel cylinders urges to decrease the power of said expansible chamber motor mechanism, a check valve intermediate said master cylinder and said wheel cylinders arranged to check the flow of fluid from said wheel cylinders to said master cylinder, yielding means to urge to keep said last mentioned check valve in a closed position, means to establish communication between said wheel cylinders and said cylinder of larger diameter when the pressure in the latter is relieved to permit the return of hydraulic fluid from said wheel cylinders to said cylinder of larger displacement, and means to permit the flow of hydraulic fluid to said master cylinder from said cylinder of larger displacement when in the starting position but not permitting reverse flow.

8. The construction as claimed in claim 7, means responsive to the hydraulic pressure of the fluid communicated to said wheel cylinders to oppose said yielding means to provide the flow of fluid from said master cylinder to said wheel cylinders after a certain pressure is reached, a light auxiliary spring to urge said check valve intermediate said master cylinder and said wheel cylinders in a closed position to provide a given pressure differential, and spring means to urge said valve means to reduce the power of said expansible chamber motor mechanism.

9. In a hydraulic braking system having a master cylinder operated by the operator and wheel cylinders to operate the brakes, a booster comprising a relative large cylinder and a relatively small cylinder communicating respectively with the wheel cylinders and with the master cylinder, a larger piston in said relatively large cylinder and a smaller piston in said relatively small cylinder, a check valve interposed between said larger cylinder and said wheel cylinders to check the flow of fluid from the wheel cylinders to said larger cylinder, said pistons having mechanical connection with each other so as to render said larger piston movable by said smaller piston through the displacement of fluid from said master cylinder into said smaller cylinder, a motor mechanism for moving said larger piston, follow-up control means for causing said motor mechanism to operate said larger piston in proportion to fluid displaced from said master cylinder into said smaller cylinder, a second check valve controlling communication between said master cylinder and said wheel cylinders to prevent the flow of fluid from said wheel cylinders to said master cylinder, yielding means urging said second check valve to closed position and adapted to release said check valve upon the building up of a relatively high master cylinder pressure in proportion to the wheel cylinder pressure, means biasing said first named check valve to open position and yieldable under pressures in said larger cylinder above a predetermined point, and a passage for returning fluid from said larger cylinder to said master cylinder when said larger piston is in fully retracted position.

10. Apparatus constructed in accordance with claim 9 wherein said last named means comprises a spring biasing said first named check valve to closed position, and a device responsive to pressures in said larger cylinder to oppose said spring whereby said first named check valve is released for movement to closed position when pressures in said larger cylinder are above a predetermined point.

WILLIAM STELZER.